Jan. 4, 1938.  N. O. GROSSER  2,104,123
AUTOMATIC FEED DRILL
Filed July 28, 1936
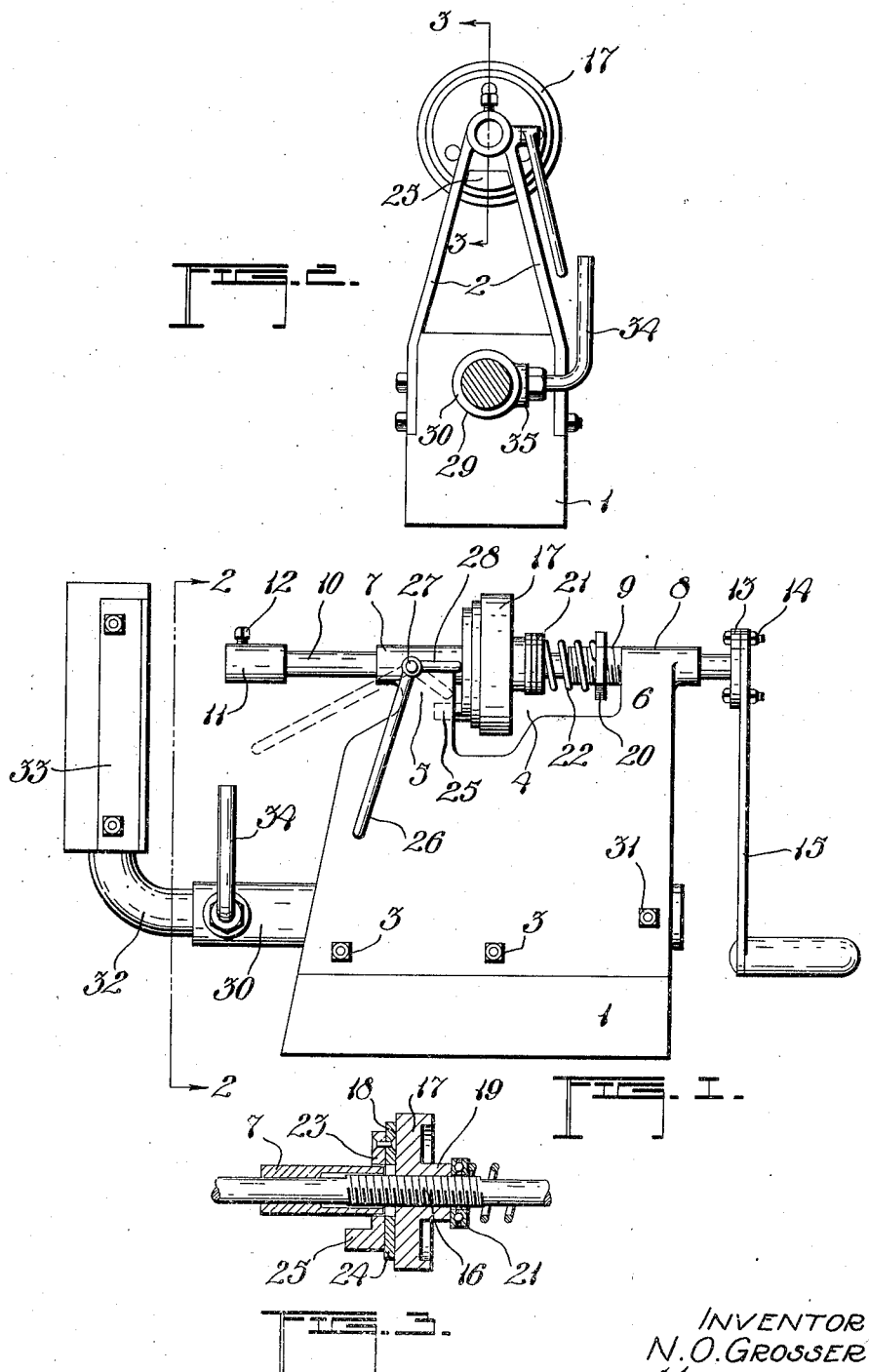
INVENTOR
N. O. GROSSER
BY Featherstonhaugh & Co.
ATTYS.

Patented Jan. 4, 1938

2,104,123

UNITED STATES PATENT OFFICE 2,104,123

AUTOMATIC FEED DRILL

Nelson O. Grosser, Prince Albert, Saskatchewan, Canada

Application July 28, 1936, Serial No. 93,110

1 Claim. (Cl. 77—34)

This invention relates to improvements in automatic feed drills, and an object of the invention is to provide a device of the character herein described which will feed the bit forwardly as the drill is rotated but which will prevent the bit from exerting excessive pressure against the work being executed, which pressure might damage the work or destroy the bit.

A further object of the invention is to provide a device of the character herein described in which the feeding mechanism urges the rotating shank forwardly by means of a nut threadably mounted thereon, the nut being normally maintained in a stationary position by a friction disc bearable thereagainst.

A further object of my invention is to provide a device of the character herein described in which the normal and maximum pressures exerted by the bit on the work may be adjusted.

A still further object of my invention is to provide a device of the character herein described which is simple and rugged in construction, is economical to manufacture and will not easily become out of order.

With the above more important objects in view and such other minor objects as may appear as the specification proceeds, my invention consists essentially in the arrangement and construction of parts all as hereinafter more particularly described, reference being had to the accompanying drawing, in which:—

Fig. 1 illustrates a side elevation of my improved type of automatic drill.

Fig. 2 is a front sectional elevation taken on the line 2—2 Figure 1.

Fig. 3 is a sectional detail view taken on the line 3—3 Figure 2.

In the drawing like characters of reference indicate corresponding parts in the different figures.

This invention consists of a bed or casting 1 to either side of which are attached a pair of mutually converging plates 2 which are attached to the bed by bolts 3 or by any other convenient method. An aperture 4 having a configuration as clearly shown in Fig. 1 is cut in the upper ends of the plates and the arms 5 and 6 on either side thereof, are formed to receive bearings 7 and 8 which are integrally attached thereto. It should be noted that the rear bearing designated by the numeral 8 is extended forwardly and is threaded as at 9 for a purpose presently to be explained. Mounted within these bearings is a central shank 10 provided at the forward end with a cylindrical clutch 11 having a set screw 12 extending through the wall thereof. The opposite end of the shank is formed with a circular flange 13 to which is attached by means of bolts 14, a manually operable crank 15.

Substantially centrally disposed along the length of the shank is a threaded portion 16 designed to receive an internally tapped nut or collar 17, the forward face 18 of which is essentially a plane surface. From the opposite side of the collar extends a short sleeve 19.

Mounted upon the threaded portion 9 of the sleeve 8 is an adjustable nut 20 and bearing against the face of the sleeve 19 is a small thrust bearing 21 which is freely mounted upon the shaft 10. Interposed between this bearing and the nut 20 is a compression spring 22 which is adapted to maintain the bearing in contact with the face of the sleeve 19 at all times.

Extending around, and freely mounted upon the inner end of the sleeve 7 is a friction disc 23 to the face of which is attached a layer 24 of friction material such as leather or any other suitable substance. If desired, however, the friction layer 24 may be dispensed with, as it has been found that the device will operate very satisfactorily when utilizing the frictional force developed between the opposing faces of the collar 17 and the disc 23. The lower end of the disc 23, it should be mentioned, is provided with a forwardly extending integral lug 25 having a configuration as most clearly shown in Fig. 2 which is designed to be received between the inner faces of the side plates 2 and thus to prevent rotation of the friction disc, but to allow shifting movement thereof on the bearing 7.

Mounted on one side of the bearing 7 is an angulated lever arm 26 which is pivoted at 27. The inner end of this arm is provided with a short finger 28 which is bearable against the forward surface of the disc 23. It should here be noted that when the lever is raised to the position shown in phantom lines, the force of the spring 22 will urge the collar 17 forwardly to ultimately bear against the inner end of the bearing 7 upon which the friction disc is mounted. When this occurs, there is no pressure between the layer 24 and the collar and consequently, no friction therebetween. However, lowering the lever to the position shown in full lines will cause the finger 28 to engage with the friction disc and force the friction layer 24 against the face of the collar 17, thus producing a considerable frictional retarding force therebetween when the shank 10 is rotated.

Extending through the circular passage 29, within the bed 1 of the device, is a sleeve 30 which is held firmly in position by a bolt 31 passing therethrough. Into the forward end of this sleeve is inserted a turned arm 32 on the upper end of which is affixed any conventional type of drill shoe or table 33.

In order to adjust the position of the table a lever 34 is threadably received within a boss 35 upon the side of the sleeve 30 and acts in the manner of a set screw to maintain the arm 32 in any desired position. Although in the drawing accompanying this application only a single lever 34 has been illustrated, it has been found somewhat more convenient to have a second lever attached to the sleeve 30 by a boss diametrically opposed to the boss 35. This arrangement permits the operator of the device to adjust the table 33 from either side of the drill.

The structure of my improved type of drill having been given, its mode of operation will now be presented.

If the lever 26 is raised to the position shown in broken lines and the shank 10 is rotated by means of the crank 15, it will not move forwardly for the collar 19 will simply rotate with the shank as there is not sufficient friction between the collar and the inner end of the bearing 7 to retard this member. If, however, the lever 26 is lowered and the friction material 24 is forced against the face of the collar, it will cease rotating and the shank 10 will thread through the central portion thereof, thus advancing the chuck 11.

If, while operating, a piece of hard material were encountered by the bit, instead of the shank urging forwardly and probably breaking the bit, the collar 17 would commence to rotate against the friction material 24 and thus relieve the forward motion of the shank. In this manner, the collar and braking disc act both as an end shifting mechanism for the shank and also as a safety device to prevent the bit from exerting excessive pressure upon the work that it is progressing through.

It will therefore be seen that when drilling, the device will adjust itself to materials of various hardnesses.

The nut 20, it should be mentioned, is used to adjust the pressure of the spring 22 against the thrust bearing and thus the pressure of the collar 17 upon the friction material 24 as the frictional force between the two elements determines the pressure that the bit will exert, the nut 20 is therefore used to adjust the normal pressure of the bit against the work being executed.

From the foregoing, it will now be obvious that I have invented an extremely useful and compact type of drill, which prevents continual breaking of bits when used to drill hard material, is simple in construction, and will not easily become out of order.

Since various modifications can be made in the above invention, and many apparently widely different embodiments of same made within the scope of the claim without departing from the spirit and scope thereof, it is intended that all matter contained in the accompanying specification shall be interpreted as illustrative only and not in a limiting sense and I desire only such limitations placed thereon as are specifically expressed in the accompanying claim.

What I claim as my invention is:

A drilling machine comprising in combination, a framework, a pair of bearings mounted thereon, a rotatable element threadably received upon one of said bearings, a rotatable shaft mounted within said bearings, a collar threadably secured upon said shaft, a spring member engageable with said element and adapted to exert pressure against said collar, a friction disc slidably mounted upon the other of said bearings, a lug protruding therefrom adapted to engage with a portion of said framework to prevent rotation of said disc, manually operable lever means for urging said disc into engagement with said collar, said lever means being adapted when in a selected position to permit complete disengagement of said disc from said collar.

NELSON O. GROSSER.